United States Patent Office 3,144,377
Patented Aug. 11, 1964

3,144,377
ANCHORAGE OF COATINGS ON CELLULOSIC MATERIALS THROUGH AN ALKALINE RESIN-FREE MATERIAL
Frank Elisha Eastes, New Castle, Del., assignor to E. I. du Pont de Nemours and Company, Wilmington, Del., a corporation of Delaware
No Drawing. Filed Oct. 27, 1960, Ser. No. 65,286
23 Claims. (Cl. 161—249)

The invention relates to moistureproof, heat sealable, flexible regenerated cellulose film. More particularly, it relates to such films and methods for their manufacture. Still more particularly, this invention relates to laminated cellulose films having moistureproof coatings.

The properties of the regenerated cellulose films can be enhanced by the application of coatings to the surface of the films. In this manner, films with increased moistureproofness and abrasion resistance can be obtained. One of the major problems, however, consists in the adhesion and anchorage of such coatings to the regenerated cellulose films. When coated films are used to package materials of high moisture content or when the films come in contact with an atmosphere of high humidity or aqueous media, the cellulose base film tends to swell and the surface coating tends to degrade. A number of substances have ben proposed to enhance anchorage and thereby prevent the aforementioned deficiencies. However, the addition of most substances and compositions used to improve anchorage, such as melamine and urea-formaldehyde thermosetting resins, causes a serious disadvantage, i.e., contamination of the drying rolls. Contamination of the drying rolls seriously affects the uniformity of anchorage and appearance of the resulting film.

A further problem that presents itself in the use of conventional anchorage resins is blocking. In the film industry it is a common practice to apply the anchorage resin sometime prior to applying the film coating. The film may then be dried and wound on a roll to remain in storage for a matter of hours or days, depending on inventory, before it is again unwound for application of the coating. During this interval, conventional anchorage resins cause "blocking" of the film making it difficult or impossible to unwind the treated film for application of the coating. This is caused primarily by the curing of the anchorage resin which takes place progressively over a period of time.

It is an object of this invention to provide coated cellulose materials having good moistureproof characteristics. It is a further object to provide coated cellulose films wherein the coating is well anchored to the film base. Another object is to provide such films with anchorage characteristics that are resistant to loosening (delaminating) or sloughing of coatings when the articles are exposed to high humidity or aqueous media. Yet another object is to provide such films wherein blocking will not be experienced between treatment to improve anchorage and subsequent coating of the film. Still another object is to provide a laminated cellulose film having a moistureproof coating resistant to loosening. A further object is to provide such films having high bond strength between the laminae which are moistureproof. Other objects will appear hereinafter.

These and other objects are accomplished by the instant invention which comprises, in a process for the production of cellulose materials coated with a moistureproof coating and having improved anchorage between the material and the coating at high humidity or exposure to aqueous media, the improvement which consists in treating cellulose material with an alkaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$ and mixtures thereof, drying said film and subsequently coating said film on at least one side with an acid polymeric coating comprising a copolymer of from 30 to 97% by weight of vinylidene chloride, from 0.1 to 25% by weight of an acidic ethylenic compound, and from about 3 to 40% by weight of another ethylenically unsaturated monomer, wherein the ratio $(B/A)$ of the alkalinity $(B)$ of said film to the acidity $(A)$ of the coating (both expressed as equivalent weights) is at least 1.

A further embodiment of this invention is a process for making laminated film wherein the gel regenerated cellulose films are treated with an alkaline material described above and at least 0.05 gram of dry polymer solids per square meter of the copolymer described above is deposited on at least one of the laminating surfaces and said coated films are brought into intimate contact to effect a lamination. One or both surfaces of the film may then be given a copolymer overcoat such as previously described.

Preferably, the coating comprises a copolymer of from 80 to 97% by weight of vinylidene chloride, 1 to 5% by weight of an acidic ethylenic compound, and from about 3 to about 19% by weight of another ethylenically unsaturated monomer. More preferably, the acidic ethylenic compound is selected from the group consisting of itaconic acid, acrylic acid and methacrylic acid and the other ethylenically unsaturated monomer is selected from the group consisting of alkyl acrylates and methacrylates having from 1 to 18 carbon atoms in the alkyl group, acrylonitrile, vinyl chloride, vinyl acetate, methacrylonitrile, and methyl vinyl ketone. Of the acidic compounds, itaconic acid is most preferred and methyl acrylate is the most preferred of the other monomers.

The preferred alkaline materials are sodium hydroxide, sodium acetate, potassium acetate, sodium bicarbonate, sodium aluminate, borax, sodium citrate, disodium phosphate, sodium bisulfate plus sodium bicarbonate, and mixtures of the above.

Normally in the production of regenerated cellulose film by the viscose casting process, the regenerated cellulose base film normally is about neutral.

It appears necessary that the polymeric coating of this invention have an acidic component and that a sufficient amount of alkaline material must be incorporated into the base film to insure neutralization of a large part, preferably all, of the acidic component of the coating. For best results, it appears necessary that the base film contain an amount of alkaline material considerably greater than the calculated amount required to neutralize the acidic component of the coating. There is evidence that the base film contains acidic components which are also neutralized by the added alkaline material, hence, this probably explains why excess alkalinity is needed for optimum "alkaline anchorage" results.

To be accepted by the trade, a coated regenerated cellulose film must have a minimum peel heat-seal level of 170 grams/1.5 inches at 81% relative humidity (R.H.). It has been found that a minimum ratio $(B/A)$ of the alkalinity $(B)$ of the regenerated cellulose base film to the acidity (A) of the coating composition of at least 1 is necessary to provide this minimum peel heat-seal level. The determination of the latter will be explained in detail hereinafter.

The desired alkalinity may be obtained by the addition of an alkaline material (such as sodium hydroxide) in rather small quantities in an aqueous media to cellulose base film during the casting process, such as just prior to the drying operation, (e.g., in the softener bath).

Preferably, the aqueous dispersion of a copolymer of vinylidene chloride, methyl acrylate and itaconic acid in the ratio by weigh of (94/6/1) is used as the intermediate layer betwen the laminated films.

The amount of aqueous dispersion of the copolymer of vinylident chloride/methyl acrylate/itaconic acid used as the intermediate layer appears to affect anchorage in the following manner: Between 0 and 0.1 gm./m.$^2$ of the copolymer solid between the laminate sheets, the bond strength at 81% R.H. changes very rapidly with polymer concentration. Above 0.1 gm./m.$^2$ of copolymer the bond strength increases gradually with increasing copolymer content. Increasing the amount of aqueous dispersion of the copolymer of vinylidene chloride/methyl acrylate/itaconic acid used in the intermediate layer appears to effect increase strength and rigidity over regenerated cellulose films of the same thickness.

Preferably, the best results are obtained by applying the coating of the aqueous dispersion of vinylidene chloride copolymer to all the film surfaces which are to be brought into contact. However, if desired, aqueous dispersion of vinylidene chloride copolymer may be applied to only one of each pair of film surfaces which are to be brought into contact.

It is necessary that the intermediate layer and subsequent coating have an acidic component and that a sufficient amount of alkaline material be incorporated into the base sheet to insure neutralization of a large part, preferaby all, of the acidic component of the intermediate layer and coating. For best results with "alkaline anchorage," it appears necessary that the base film contain an amount of alkaline material considerably greater than the calculated amount required to neutralize the acidic component of the coating and intermediate layer. There is evidence that the base film contains acidic components which are also neutralized by the added alkaline material; this probably explains why the excess alkalinity is needed for optimum "alkaline anchorage" results.

Before discussing the examples, it is prudent at this point to define the terms and tests used to evaluate the various films prepared.

By the term "gel film" is meant film in the swollen, water-containing state which the films initially possess from manufacture prior to being fully dried.

*Peel heat-seal strength* is a measure of the strength of the bond between two films when they are sealed together by heat and pressure. A piece of the coated film 4" x 10" with the grain running in the long direction is cut into two pieces 4" x 5". The two pieces are superimposed so that opposite surfaces are in contact. The two pieces of superimposed film are then sealed together at each end at right angles to the grain. A ¾" wide sealing bar heated to a temperature of 145° C. contacts the end for 2 seconds at a pressure of 20 p.s.i. The sealed films are then cut in half at right angles to the grain. From the center of the four resulting pieces, 1.5" wide strips parallel to the grain are cut. The four sets of strips are then conditioned for 72 hours at 75° F. at the desired relative humidity. They are tested by opening each set of strips at the free ends, placing them in a Suter testing machine and pulling them apart. The force in grams required to separate the seal after it has been ruptured is the peel heat-seal strength.

*Anchorage* refers to the adhesion of the coating to the base film when in direct contact with water and is evaluated in two ways.

I. Samples of coated film are suspended in water at 45° C. for 16 hours and then graded approximately as follows:
    1—no blisters
    2—few blisters
    3—decided blistering
    4—coating sloughs off the blistered or unblistered portions II. Samples of coated film are immersed in boiling water (99–100° C.) for 15 minutes and checked for sloughing of the coating. A notation "No" means no noticeable sloughing occurred.

*Matting* is defined as the tendency of a film to adhere when two or more surfaces are pressed together.

*Blocking* is matting so severe that sheets of film become firmly cemented together and cannot be separated without damaging them.

QUANTITATIVE DETERMINATION OF THE PERCENT ALKALINITY OF UNCOATED CELLOPHANE (1) Quickly cut a 5 to 6 gram sample of film from across the entire width of a freshly made roll of regenerated cellulose, then place this sample in a tared, moistureproof container and then weigh accurately on an analytical balance. (Close adherence to this sampling procedure will prevent moisture pick-up by the regenerated cellulose which is rather hydroscopic.)

(2) After weighing the sample, remove it from the moistureproof container and cut it into small pieces about ⅛" square.

(3) Place the weighed and cut cellophane sample in a 250 ml. beaker containing 150 ml. of distilled water.

(4) Add a few drops of an appropriate indicator suitable for the titration of the particular alkaline or acid material contained in the regenerated cellulose sample.

(5) While vigorously agitating the 150 ml. of water containing the small pieces of regenerated cellulose, titrate very slowly to the end point with either a standard 0.025 normal solution of hydrochloric acid or a standard 0.025 normal solution of sodium hydroxide. (The choice of the standard solution used in the titration depends upon whether the regenerated cellulose is being analyzed for an alkaline or acid material.)

(6) The results of the titration are then used to calculate the percent "alkalinity" of the regenerated cellulose expressed on the basis of sodium hydroxide. If the regenerated cellulose sample contains an alkaline material, the percent "alkalinity" will be a positive value. If the regenerated cellulose contains an acid material, the percent "alkalinity" will be a negative value.

A sample of regenerated cellulose (containing a small amount of disodium phosphate) about 48" x 4" in size was quickly cut from a roll immediately after a roll break and the sample placed in a moistureproof container weighing 131.893 grams. This sampling operation required only a few seconds' time. Using an analytical balance, the weight of the container and sample was found to be 137.265 grams, hence, the weight of the regenerated cellulose sample was 5.372 grams.

The sample was removed from the container, cut into small pieces about ⅛" square, then placed in a 250 ml. beaker containing 150 ml. of distilled water. Four drops of a 0.10% solution of methyl red indicator was then added to the water containing the regenerated cellulose sample and was then titrated with 0.025 normal hydrochloric acid. The hydrochloric acid was added very slowly during the titration while the water containing the regenerated cellulose was being agitated very vigorously. At the end point of the titration, the red color of the indicator showed no tendency to fade. The amount of standard hydrochloric acid required to reach the end point was 8.25 ml.

The percent alkalinity of the regenerated cellulose sample was calculated to be 0.154 using the data obtained and the following equation:

$$\text{Percent alkalinity (as NaOH)} = \frac{(\text{Ml. of HCl used}) \times (\text{Normality of HCl}) \times \left(\frac{\text{Mol. wt. of NaOH}}{1000}\right) \times (100)}{(\text{Wt. of regenerated cellulose sample})}$$

CALCULATION OF THE RATIO (B/A) OF THE ALKALINITY (B) OF THE CELLULOSE BASE SHEET TO THE ACIDITY (A) OF THE COATING

The method for calculating (B/A) can best be explained by the following hypothetical example.

*Problem.*—A cellulose base sheet containing 0.10% alkalinity (expressed as NaOH) and having a unit weight of 40 gm./m.² was coated with an aqueous dispersion of the copolymer of vinylidene chloride, methyl acrylate and itaconic acid in the ratio by weight of 93/6/1 to yield coated film having a coating weight of 5 gm./m.². What is the ratio (B/A) of the alkalinity (B) of the base sheet to the acidity (A) of the coating (both alkalinity and acidity being expressed as equivalent weights)?

*Solution.*—The equivalent weight (B) of the alkaline material in one square meter of the cellulose base sheet may be calculated as follows:

$$B = \frac{(\text{Percent alkalinity of base sheet})(\text{Unit wt. of base sheet})}{100 \ (\text{Gram mol. wt. of NaOH})} = \frac{(0.10)(40)}{(100)(40.00)} = 0.001$$

The equivalent weight (A) of the acid contained in the coating of one square meter of the coated film may be calculated as follows:

$$A = \frac{(\text{Wt. fraction of coating composed of itaconic acid})(\text{gm./m.}^2 \text{ coat})}{(\tfrac{1}{2})(\text{Gram mol wt. of itaconic acid})} = \frac{\left(\tfrac{1}{100}\right)(5)}{(\tfrac{1}{2})(130.10)} = 0.000768$$

Hence, the ratio B/A for the coated film is $$B/A \frac{0.001}{0.000768} = 1.30$$

This invention will now be described in the following examples:

*Example I*

A film of gel regenerated cellulose which had been desulfured, bleached and washed free of impurities on a casting machine was passed, prior to any drying thereof, through an aqueous alkaline medium (pH of 10) containing 5.5% of softener (ethylene glycol) and 0.04% of sodium hydroxide at 75° C. The excess treating medium was removed from the film by squeeze rolls and the film was then passed through the dryer in the normal manner. The unit weight of the dried base film was 38.7 gm./m.². After a lag storage time of 24 hours, the film was rewound and showed no tendency to mat or block. The resultant film was then passed through an aqueous dispersion of the copolymer of vinylidene chloride/methyl acrylate/itaconic acid (94/6/1; prepared in the manner described in U.S. Patent 2,570,478), through the coating tower and wound up in a roll. The resultant film contained 7.0% water, 19.5% softener (ethylene glycol), and a coating weight of 5.54 gm./m.². The ratio of alkalinity of the dried base film to the acidity of the coating was 1.62 (based on equivalent weights). The resultant film was conditioned at 35% R.H. for 72 hours at 75° F. and the peel heat-seal level under 20 p.s.i. for 2 seconds at 145° C. was 407 gm./1.5″. Similarly, the film was conditioned at 81% R.H. for 72 hours at 75° F. and under the same conditions the peel heat-seal level was 288 gm./1.5″. Anchorage (I) of the coating, as measured under a standard test of 16 hours immersion in water at 45° C., was Grade 1. Samples were immersed in boiling water for 2 days without sloughing (II).

In attempting to determine coating weight by a stripping method, samples were soaked for 20 minutes in hot 5% acetic acid solution (60 to 70° C.). Attempts were made to pull off the coating, but it could not be removed. As a result, the coating weights were determined by use of an ultraviolet spectrophotometer.

*Example II*

A roll of regenerated cellulose film was produced using a softener bath containing 5.5% ethylene glycol and 0.04% sodium hydroxide. This film contained 13.7% ethylene glycol, 0.184% alkalinity and had a unit weight of 38.7 gm./m.². A portion of this film was coated with an aqueous dispersion of the copolymer of vinylidene chloride, methyl acrylate and methacrylic acid in the ratio by weight of 94/6/1. The dispersion also contained 21% ethylene glycol. The coated film had the following analysis and physical properties:

| | |
|---|---:|
| Percent H₂O | 6.9 |
| Percent ethylene glycol | 19.2 |
| Coating weight (gm./m.²) | 6.56 |
| Anchorage: | |
| (I) | 1 |
| (II) | No |
| 35% R.H. heat seal (gm./1.5″) | 297 |
| 81% R.H. heat seal (gm./1.5″) | 218 |

The ratio of the alkalinity of the base film to the acidity of the coating composition was 2.36 (based on equivalent weights).

*Example III*

A portion of the same roll of regenerated cellulose film used in Example II was coated with an aqueous dispersion of the copolymer of vinylidene chloride, methyl acrylate and acrylic acid in a ratio by weight of 94/6/1. The dispersion also contained 21% ethylene glycol. The results on the coated film were as follows:

| | |
|---|---:|
| Percent H₂O | 7.3 |
| Percent ethylene glycol | 21.0 |
| Coating weight (gm./m.²) | 5.94 |
| Anchorage: | |
| (I) | 1 |
| (II) | No |
| 35% R.H. heat seal (gm./1.5″) | 190 |
| 81% R.H. heat seal (gm./1.5″) | 182 |

The ratio of the alkalinity in the base film to the acidity of the coating was 2.18 (based on equivalent weights).

Example IV

A roll of regenerated cellulose film was produced using a softener bath (pH=8.4) containing 5.5% ethylene glycol and 0.49% borax ($Na_2B_4O_7 \cdot 10H_2O$). This film contained 13.1% ethylene glycol, 2.6% $H_2O$, 0.232% alkalinity and had a unit weight of 30.9 gm./m.$^2$. This roll of regenerated cellulose film was coated using an aqueous dispersion of the copolymer of Example I. The results of the film evaluation were as follows:

| | |
|---|---|
| Percent $H_2O$ | 6.2 |
| Percent ethylene glycol | 19.9 |
| Coating weight (gm./m.$^2$) | 5.50 |
| Anchorage: | |
| (I) | 1 |
| (II) | No |
| 35% R.H. heat seal (gm./1.5″) | 358 |
| 81% R.H. heat seal (gm./1.5″) | 228 |

The ratio of the alkalinity of the base film to the acidity of the coating was 2.13 (both based on equivalent weights).

Example V

A roll of regenerated cellulose film was produced using a softener bath containing 5.5% ethylene glycol and 0.44% sodium acetate. The film had a unit weight of 30.1 gm./m.$^2$ and contained 11.7% ethylene glycol, 3.0% $H_2O$, and 0.52% alkalinity (Brom phenol-blue was used as the indicator in the titration of the base film). This roll of film was coated using an aqueous dispersion of the copolymer of Example I. During the coating operation there was an odor of acetic acid. This liberation of acetic acid apparently resulted from the neutralization reaction occurring between the sodium acetate and the itaconic acid contained in the coating. The results of the evaluation of the coated film were as follows:

| | |
|---|---|
| Percent $H_2O$ | 6.4 |
| Percent ethylene glycol | 21.0 |
| Coating weight (gm./m.$^2$) | 5.54 |
| Anchorage: | |
| (I) | 1 |
| (II) | No |
| 35% R.H. heat seal (gm./1.5″) | 232 |
| 81% R.H. heat seal (gm./1.5″) | 170 |

The ratio of the alkalinity of the base film to the acidity of the coating was 4.46. The ionization constant of acetic acid ($1.86 \times 10^{-5}$) lies between the first and second ionization constants of itaconic acid ($1.5 \times 10^{-4}$ and $2.8 \times 10^{-6}$, respectively); hence, sodium acetate (hydrolysis constant $=5.38 \times 10^{-10}$) should be expected to neutralize only about one half (the strongest acid group) of the itaconic acid in the coating.

Example VI

A roll of regenerated cellulose film was made using a softener bath containing 5.5% ethylene glycol and 0.21% of a mixture of the mono/disodium phosphate in a ratio of 1/46 (pH=8.2). This roll of film had a unit weight of 30.5 gm./m.$^2$ and contained 3.2% $H_2O$, 13.4% ethylene glycol and 0.22% alkalinity. Upon coating this film with an aqueous dispersion of the copolymer of Example I containing 19% ethylene glycol, the physical properties and analysis of the coated film were found to be as follows:

| | |
|---|---|
| Percent $H_2O$ | 8.2 |
| Percent ethylene glycol | 20.5 |
| Coating weight (gm./m.$^2$) | 5.70 |
| Anchorage: | |
| (I) | 1 |
| (II) | No |
| 35% R.H. heat seal (gm./1.5″) | 261 |
| 81% R.H. heat seal (gm./1.5″) | 257 |

The ratio of the alkalinity of the base film to the acidity of the coating was 1.93.

Example VII

A roll of gel regenerated cellulose film was impregnated using a softener bath containing 13% ethylene glycol and 0.15% sodium bicarbonate, then the film was dried to a moisture content of about 3%. This film analyzed 0.088% alkalinity and had a unit weight of 39 gm./m.$^2$. Upon coating this film with an aqueous dispersion of the copolymer of Example I containing 19% ethylene glycol, the resulting coated film was found to have anchorage (I)—1, (II)—No, and heat-seal strength of 407 gm./m.$^2$ at 35% R.H. and 308 gm./m.$^2$ at 81% R.H. The coating weight was found to be 4.8 gm./m.$^2$. The ratio of the alkalinity of the base film to the acidity of the coating was 1.28.

Example VIII

Gel regenerated cellulose film was passed through a softener bath containing 13% ethylene glycol and 0.15% sodium aluminate ($NaAlO_2$) to produce a roll of film containing 0.088% alkalinity and a unit weight of 30 gm./m.$^2$. The coated film obtained by coating with an aqueous dispersion of the copolymer of Example I had anchorage (I)—1, (II)—No, and heat-seal strengths of 373 gm./1.5″ at 35% R.H. and 178 gm./1.5″ at 81% R.H. The coating weight was found to be 4.85 gm./m.$^2$. The ratio of the alkalinity of the base film to the acidity of the coating was 1.16.

Example IX

A roll of regenerated cellulose film was produced and passed through a softener bath containing 13% ethylene glycol and 0.3% sodium hydroxide. This dried base film had a unit weight of 39 gm./m.$^2$, and contained 20% ethylene glycol and an alkalinity of 0.1%.

This film was coated with the copolymer of Example I from a tetrahydrofuran/toluene (65/35) solution (25% solids basis).

The analysis and physical properties of the coated film were as follows:

| | |
|---|---|
| Percent $H_2O$ | 6.0 |
| Percent ethylene glycol | 18.0 |
| Coating weight (gm./m.$^2$) | 5.0 |
| Anchorage: | |
| (I) | 1 |
| (II) | No |
| 35% R.H. heat seal (gm./1.5″) | 380 |
| 81% R.H. heat seal (gm./1.5″) | 303 |

The ratio of the alkalinity of the base film to the acidity of the coating was 1.10 (based on equivalent weights).

Example X

Two gel films of regenerated cellulose which had been formed simultaneously, then desulfured, bleached and washed free of impurities on a casting machine were passed, prior to any drying thereof, through an aqueous alkaline medium (pH of 10 containing 5.5% of softener ethylene glycol) and 0.04% of sodium hydroxide at 75° C. The excess treating medium was removed from the films by squeeze rolls. The separated films then passed by a kiss roll where the inner surface of the lower film was coated with an aqueous dispersion of the copolymer of vinylidene chloride/methyl acrylate/itaconic acid (94/6/1; prepared in the manner described in U.S. Patent 2,570,478) at the rate of 0.52 gram per square meter. The gel films were then brought together and without further separation, were passed through the drying zone in continuous intimate contact and the moisture content of the laminated film was reduced to about 7%. The resultant film contained 7.0% water, 9.18% softener (ethylene glycol) and had a unit weight of 88.4 grams per square meter. The ratio of the alkalinity of the dried base film to the acidity of the copolymer coating the intermediate layer was 13.6 (based on equivalent weights). The resultant film was conditioned at 35% R.H. for 72 hours at 75° F. and an attempt was made to measure the force required to separate the laminated sheets using a Suter testing machine; however, the bond strength was so high that the film broke before delaminating. Similarly, the film was conditioned at 81% R.H. for 72 hours at 75° F. and under these conditions, the laminate bond strength was 236 grams per 1½ inches.

The laminate film was then passed through an aqueous dispersion of the copolymer of vinylidene chloride/methyl acrylate/itaconic acid (94/6/1; prepared in the manner described in U.S. Patent 2,570,478) containing 37% copolymer, 20% glycerine, through the coating tower, dried and wound up in a roll. The resulting coated film contained 5.0% water, 9.5% softener (ethylene glycol and glycerine), and had a coating weight of 4.0 grams per square meter. The ratio of alkalinity of the base film to the acidity of the intermediate layer and subsequent coating was 1.57 (based on equivalent weights). The resultant film was conditioned at 81% R.H. for 72 hours at 75° F. and the peel heat-seal level under 20 pounds per square inch for 2 seconds at 145° C. was 199 grams per 1½ inches. Anchorage (I) of the coating, as measured under a standard test of 16 hours immersion in water at 45° C. was Grade 1.

In attempting to determine coating thickness by stripping method, samples were soaked for 20 minutes in hot 5% acetic acid solution (60–70° C.). Attempts were made to pull off the coating, but it could not be removed.

In contrast to the above examples of successful operation within the scope of this invention, a number of experiments were run omitting one or more essential features of the invention.

Two films were made in substantially the same manner as the one made in Example I except that the coating resin contained no acid component. These films both possessed inadequate heat-seal strengths and anchorage and were subject to sloughing.

Another film was produced substantially as that in Example I except that the base film was not treated with alkaline material. The heat seal strength was inadequate and, although the anchorage (I) was grade 1, anchorage (II) gave severe sloughing.

A further film was made in substantially the same manner as that in Example I except that instead of alkaline treatment of the base film, a guanidine modified urea-formaldehyde anchorage resin was used. Although the anchorage (I) was grade 1, the heat-seal strength was inadequate and anchorage (II) showed severe sloughing.

The above illustrate the criticality of operating within the scope of the limits of the invention to produce acceptable films.

The following compositions have been employed successfully to impart desired alkalinity to the cellulosic base film: sodium hydroxide, sodium acetate, potassium acetate, sodium bicarbonate, sodium aluminate, borax, sodium citrate, disodium phosphate, sodium bisulfite plus sodium bicarbonate, and mixtures of the above. In each instance the anchorage was obtained without the disadvantages normally encountered with the usual anchor resins. Salts and hydroxides of alkali or alkaline earth metals are most suitable. The alkaline materials may be incorporated in the softener bath for treatment of the gel regenerated cellulose film at the same time and along with the softener.

In the examples, copolymers of vinylidene chloride with methyl acrylate and itaconic, acrylic or methacrylic acids were formed into dispersions; however, the invention is not limited to these. In place of methyl acrylate the following polymerizable monoolefinic monomers may be substituted: ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-phenylpropyl methacrylate and the corresponding esters of acrylic acid; methyl alpha-chloroacrylate, octyl alpha-chloroacrylate, methylisopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, n-vinyl phthalamide, n-vinyl succinimide, n-vinyl carbazole, isopropenyl acetate, methyl diethyl maleonate, acrylamide, methacrylamide or monoalkyl substitution products thereof, phenyl vinyl ketone, diethyl fumarate, diethyl maleate, ethylene diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single "$CH_2=C<$." The most useful ones fall within the general formula

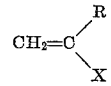

where R may be hydrogen, a halogen, or an unsaturated aliphatic radical and the X is selected from one of the following groups: -chlorine, -bromine, -fluorine, —CN, —$C_6H_5$, —COOH, —COOR', —CHO, —$OC_6H_5$, —$CONH_2$, —CONH—R', and $CONR'_2$, in which R' is alkyl. The preferred monomers are the alkyl acrylates such as methyl and ethyl acrylate, acrylonitrile, vinyl chloride, vinyl acetate, methacrylonitrile, ethyl methacrylate and methyl vinyl ketone.

Also, the polymerization charge must include an "acidic ethylenic compound," such as citraconic acid or citraconic anhydride, or mesaconic acid or a mixture of acid anhydrides, comprising citraconic anhydride and itaconic anhydride, obtainable from citric acid by distillation and also itaconic acid and itaconic anhydride, and acrylic acid and methacrylic acid in the amounts of from 0.1 to 25% by weight (preferably, 1 to 5%) of the total monomer charge.

The aqueous medium may also contain other ingredients which do not detract from the success or limit the scope of the invention. Thus, a polymerization promoting catalyst (initiator) such as ammonium persulfate, an activator for the catalyst such as sodium meta-bisulfite and an accelerator such as ferrous ammonium sulfate, may also be added to the aqueous medium. To prevent or inhibit the corrosion of metal surfaces, particularly chromium surfaces, when brought into contact with aqueous dispersions of vinylidene chloride copolymers, hydrogen peroxide, 0.01% to 1.0% by weight, based on the total weight of the dispersion, may also be added to the dispersion. The formation of the dispersion comprises emulsifying the monomers in an aqueous medium containing the below-listed dispersing agents.

Preferably, at least one compound selected from the group consisting of alkali metal alkyl sulfates and ammonium alkyl sulfates, the alkyl radical therein having 8 to 18 carbon atoms, should be added and at least one compound selected from the group consisting of the alkali metal alkyl aryl sulfates and ammonium alkyl aryl sulfonates, the alkyl radical having 5 to 20 carbon atoms in the alkyl group.

While reference herein has been made to regenerated cellulose films (cellophane), the invention is applicable to other hydrophilic pellicular material, such as films of cellulose ethers, especially the alkali-soluble, water-insoluble cellulose ethers formed by the reaction of the cellulose with ethylene oxide, methyl chloride, or ethyl chloride. The regenerated cellulose may be produced by the viscose process, the cuprammonium process, the denitration of nitrocellulose, or from solutions of cellulose, or from solutions of cellulose in organic or inorganic solvents.

This invention is further not restricted to the treatment and coating of films. Cellulosic fibers or fibrous materials may be coated with the copolymers of this invention after the treatment with the alkaline materials of this invention. Cotton and rayon fibers and woven or matted fabrics or materials thereof are among those materials which could be utilized instead of films.

Other vinylidene chloride copolymers useful in the present invention are those disclosed in Pitzl, U.S. Patent 2,570,478; Hauser, U.S. Patent 2,462,185; Hauser, U.S. Patent 2,525,671 and Hofrichter, U.S. Patent 2,711,996.

Other coating compositions applicable are those disclosed in Chapman, U.S. Patent 2,533,557; Mitchell, U.S. Patent 2,079,379; Mitchell, U.S. Patent 2,236,546; Bradshaw, U.S. Patent 2,079,395 and Ubben, U.S. Patent 2,147,180.

A primary advantage realized by this invention is the improved anchorage, particularly at high humidity. Other advantages include elimination of anchor resin and associated problems, such as contaimination of dryer rolls and resin stability, freedom from blocking in mill roll and reduced cost of treating materials.

Laminated regenerated cellulose films of the present invention have the advantage of increased strength and rigidity over such articles of the same thickness. Additionally, the resultant films are free from distortion, such as buckling, curling, creasing or wrinkling and have increased tear strength.

Prior to the coating step, films of the present invention are free from contamination on their outer surfaces by any polymeric or resinous materials; hence, there is no contamination of dryer rolls in the casting process and the uncoated laminated film may be stored for a prolonged period prior to being coated without "blocking."

What is claimed is:

1. A process for coating cellulosic materials which comprises treating hydrophilic cellulosic material with an alkaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$, and mixtures thereof; drying said material, and subsequently coating it with a copolymer of from 30 to 97% vinylidene chloride, from 0.1 to 25% of an acidic ethylenic compound, and from about 3 to 40% of another polymerizable monoolefinic monomer, wherein the ratio of alkalinity, after treatment of the cellulosic material to the acidity of said coating is at least 1.

2. In a process for the production of cellulose films coated with a moistureproof coating and having improved anchorage between the film and the coating at high humidity or on exposure to aqueous media, the improvement which consists in treating hydrophlic cellulose film with an alakaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$, and mixtures thereof; drying said film, and subsequently coating said film on at least one surface with a copolymer of from 30 to 97% vinylidene chloride, from 0.1 to 25% of an acidic ethylenic compound, and from about 3 to 40% of another polymerizable monoolefinic monomer, wherein the ratio of alkalinity, after treatment, of the base film to the acidity of said coatings is at least 1.

3. Process according to claim 2 wherein said treated hydrophilic cellulose film is a gel regenerated cellulose film.

4. Process according to claim 2 wherein said alkaline material is sodium hydroxide.

5. Process according to claim 2 wherein said coating is a copolymer of 80 to 97% vinylidene chloride, from 1 to 5% of an acid selected from the group consisting of itaconic, acrylic and methacrylic acids and from about 3 to about 19% of a monomer selected from the group consistingly of alkyl acrylates and methacrylates having from 1 to 18 carbon atoms in the alkyl group, acrylonitrile, vinyl chloride, vinyl acetate, methacrylonitrile and methyl vinyl ketone.

6. Process according to claim 2 wherein said coating is a copolymer of from 80 to 97% vinylidene chloride, from 1 to 5% itaconic acid, and from about 3 to about 19% methyl acrylate.

7. A moistureproof cellulose film which comprises a hydrophilic cellulose film base treated on at least one surface with an alkaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$, and mixtures thereof; and a polymeric coating thereover of a copolymer of from 30 to 97% vinylidene chloride, from 0.1 to 25% of an acidic ethylenic compound, and from about 3 to 40% of another polymerizable monoolefinic monomer, wherein the ratio of alkalinity, after treatment, of said film to the acidity of said coating is at least 1.

8. Film according to claim 7 wherein said hydrophilic film base is a gel regenerated cellulose film base.

9. Film according to claim 7 wherein said alkaline material is sodium hydroxide.

10. Film according to claim 7 wherein said coating is a copolymer of 80 to 97% vinylidene chloride, from 1 to 5% of an acid selected from the group consisting of itaconic, acrylic and methacrylic acids and from about 3 to about 19% of a monomer selected from the group consisting of alkyl acrylates and methacrylates having from 1 to 18 carbon atoms in the alkyl group, acrylonitrile, vinyl chloride, vinyl acetate, methacrylonitrile and methyl vinyl ketone.

11. Film according to claim 7 wherein said coating is a copolymer of from 80 to 97% vinylidene chloride, from 1 to 5% itaconic acid, and from about 3 to about 19% methyl acrylate.

12. In a process for the production of laminated cellulose films, the improvement which consists in treating hydrophilic cellulose films with an alkaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$, and mixtures thereof; subsequently coating at least one of said films on at least one surface with at least 0.05 gram per square meter of a copolymer of from 30 to 97% vinylidene chloride, from 0.1 to 25% of an acidic ethylenic compound, and from about 3 to 40% of another polymerizable monoolefinic monomer; uniting the copolymer coated surfaces of said films in intimate contact to form a lamination wherein the ratio of the total alkalinity, after treatment, of the films to the total acidity of the total copolymer is at least 1.

13. Process according to claim 12 wherein said treated hydrophilic cellulose films are gel regenerated cellulose films.

14. Process according to claim 12 wherein said alkaline material is sodium hydroxide.

15. Process according to claim 12 wherein said coating is a copolymer of 80 to 97% vinylidene chloride, from 1 to 5% of an acid selected from the group consisting of itaconic, acrylic and methacrylic acids and from about 3 to about 19% of a monomer selected from the group consisting of alkyl acrylates and methacrylates having from 1 to 18 carbon atoms in the alkyl group, acrylonitrile, vinyl chloride, vinyl acetate, methacrylonitrile and methyl vinyl ketone.

16. Process according to claim 12 wherein said coating is a copolymer of from 80 to 97% vinylidene chloride, from 1 to 5% itaconic acid, and from about 3 to about 19% methyl acrylate.

17. The process of claim 12 wherein at least one surface of the lamination is coated with a copolymer of 30 to 97% vinylidene chloride, from 0.1 to 25% of an acid ethylenic compound and from 3 to 40% of another polymerizable monoolefinic monomer.

18. A laminated moistureproof film which comprises laminae of hydrophilic cellulose film treated on their surfaces with an alkaline material soluble in aqueous medium selected from the group consisting of: (1) a hydroxide of a metal having an ionization constant of at least $10^{-11}$, (2) a metal salt of an amphoteric metal hydroxide having a hydrolysis constant of at least $10^{-11}$, (3) a salt of an acid, said salt having a hydrolysis constant of at least $10^{-11}$, and mixtures thereof; and having between the laminae a polymeric layer of a copolymer of from 30 to 97% vinylidene chloride, from 0.1 to 25% of an acidic ethylenic compound, and from about 3 to 40% of another polymerizable monoolefinic monomer, wherein the ratio of the total alkalinity, after treatment, of said laminae to the total acidity of said copolymer is at least 1.

19. Laminated film according to claim 18 wherein said laminae are gel regenerated cellulose films.

20. Film according to claim 18 wherein said alkaline material is sodium hydroxide.

21. Film according to claim 18 wherein said copolymer is of 80 to 97% vinylidene chloride, from 1 to 5% of an acid selected from the group consisting of itaconic, acrylic and methacrylic acids and from about 3 to about 19% of a monomer selected from the group consisting of alkyl acrylates and methacrylates having from 1 to 18 carbon atoms in the alkyl group, acrylonitrile, vinyl chloride, vinyl acetate, methacrylonitrile and methyl vinyl ketone.

22. Film according to claim 18 wherein said copolymer is of from 80 to 97% vinylidene chloride, from 1 to 5% itaconic acid, and from about 3 to about 19% methyl acrylate.

23. The laminated moistureproof film of claim 18 wherein at least one surface of the laminated film has coated thereover a copolymer of 30 to 97% vinylidene chloride, from 0.1 to 25% of an acid ethylenic compound and from 3 to 40% of another polymerizable monoolefinic monomer.

References Cited in the file of this patent

UNITED STATES PATENTS

| | | |
|---|---|---|
| 2,314,976 | Gazdik et al. | Mar. 30, 1943 |
| 2,823,141 | Hagan et al. | Feb. 11, 1958 |

FOREIGN PATENTS

| | | |
|---|---|---|
| 766,827 | Great Britain | Jan. 23, 1957 |

OTHER REFERENCES

McLaren: "The Adhesion of High Polymers to Cellulose—a Résumé," appearing at pp. 57–59 of "Adhesion and Adhesives Fundamentals and Practice," Society of Chemical Industry, London, 1954.

Sidgwick: The Organic Chemistry of Nitrogen; Clarendon Press, Oxford, England, 1949.